(12) United States Patent
Zheng et al.

(10) Patent No.: US 11,452,014 B2
(45) Date of Patent: Sep. 20, 2022

(54) SECONDARY LINK FOR AR/VR APPLICATIONS

(71) Applicant: Meta Platforms Technologies, LLC, Menlo Park, CA (US)

(72) Inventors: Dong Zheng, Saratoga, CA (US); Qi Qu, Redmond, WA (US); Gang Lu, Pleasanton, CA (US); Yuting Fan, Redmond, WA (US); William Louis Abbott, Portola Valley, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 94 days.

(21) Appl. No.: 16/773,515

(22) Filed: Jan. 27, 2020

(65) Prior Publication Data

US 2020/0288360 A1 Sep. 10, 2020

Related U.S. Application Data

(60) Provisional application No. 62/815,849, filed on Mar. 8, 2019.

(51) Int. Cl.
*H04W 36/00* (2009.01)
*H04W 76/15* (2018.01)
*H04W 36/30* (2009.01)
*G06F 3/14* (2006.01)
*H04W 76/34* (2018.01)
(Continued)

(52) U.S. Cl.
CPC .............. *H04W 36/03* (2018.08); *G06F 3/14* (2013.01); *H04W 24/10* (2013.01); *H04W 36/30* (2013.01); *H04W 40/02* (2013.01); *H04W 76/15* (2018.02); *H04W 76/34* (2018.02)

(58) Field of Classification Search
None
See application file for complete search history.

(56) References Cited

U.S. PATENT DOCUMENTS 9,866,286 B1 * 1/2018 Qu ..................... H04B 7/0695
2003/0030864 A1 * 2/2003 Charzinski .......... H04J 14/0241
398/58

(Continued)

OTHER PUBLICATIONS

International Search Report and Written Opinion on PCT/US2020/020017 dated Jul. 22, 2020.

(Continued)

*Primary Examiner* — Jenkey Van
(74) *Attorney, Agent, or Firm* — Foley & Lardner LLP

(57) ABSTRACT

Disclosed herein a system, a method and a device for selecting between a primary link and a secondary link for AR/VR applications. A console can provide a VR/AR session to a user through a head wearable display. The console can determine that a first measurement of a primary link between the console and a head wearable display is less than a first threshold. The first measurement can include a quality metric of the primary link. The console can activate a secondary link between the console and the head wearable display. The console can determine whether a second measurement of the primary link between the console and the head wearable display is less than a second threshold. The console can transition when the second measurement is less than the second threshold, traffic on the primary link to the activated secondary link.

20 Claims, 10 Drawing Sheets

(51) Int. Cl.
*H04W 40/02* (2009.01)
*H04W 24/10* (2009.01)

(56) References Cited

U.S. PATENT DOCUMENTS

| | | | |
|---|---|---|---|
| 2014/0219194 A1* | 8/2014 | Varoglu | H04W 76/23 |
| | | | 370/329 |
| 2016/0007084 A1* | 1/2016 | Kim | H04N 21/44245 |
| | | | 725/116 |
| 2016/0219440 A1* | 7/2016 | Wang | H04W 24/02 |
| 2016/0294681 A1* | 10/2016 | Khakpour | H04L 45/306 |
| 2016/0353301 A1 | 12/2016 | Kim | |
| 2018/0115747 A1 | 4/2018 | Bayley et al. | |
| 2018/0232955 A1* | 8/2018 | Namgoong | H04N 21/6587 |
| 2018/0309500 A1* | 10/2018 | Qu | H04B 7/15528 |
| 2019/0364464 A1* | 11/2019 | Shaikh | H04M 15/66 |
| 2020/0092785 A1* | 3/2020 | Yang | H04W 76/19 |

OTHER PUBLICATIONS

Minseok Oh (Kyonggi Univ) et al.: "Updates on Use cases and Network Requirements", IEEE Draft; 21-18-0025-00-0000-Updates-on-Use-Cases-andNetwork-Requirements, IEEE-SA Mentor, Piscataway, NJ, USA; vol. 802.21 May 9, 2018 (May 9, 2018), pp. 1-18, XP068126583, Retrieved from the Internet: URL:https://mentor.ieee.org/802.21/dcn/18/21-18-0025-00-0000-updateson-use-cases-and-network-requirements.docx [retrieved on May 9, 2018].

\* cited by examiner

SECONDARY LINK FOR AR/VR APPLICATIONS

CROSS-REFERENCE TO RELATED APPLICATION

This application claims priority to U.S. Provisional Patent Application No. 62/815,849, filed Mar. 8, 2019, which is incorporated by reference in its entirety for all purposes.

FIELD OF DISCLOSURE

The present disclosure is generally related to display systems and methods, including but not limited to systems and methods for providing a secondary link for virtual reality (VR) or augmented reality (AR) applications.

BACKGROUND

Wearable display technologies can provide a virtual reality or augmented reality experience to a user wearing the respective display device. They can provide a series of computer generated images to allow the user to interact with the respective images. For example, the display devices can include head mounted devices that are positioned over or within the field of view of the user such that the field of view of the display device replaces the users natural field of view.

SUMMARY

Disclosed herein are embodiments of devices, systems and methods for determining whether to use a primary link or a secondary link for a VR or AR application. A head wearable display can be connected with a console to provide a VR or AR application (e.g., VR/AR experience) to a user of the head wearable display. The console and head wearable display can be connected through at least one primary link and/or secondary link. In some embodiments, the primary link can provide or support a full VR/AR experience and the secondary link can provide supplemental or back-up coverage for the primary link or can support limited/minimum use cases. For example, the secondary link can be activated to support traffic between the console and the head wearable display in response to a reduced quality (e.g., delays, failures, blockage being detected/experienced) of the primary link. The console can determine to use the primary link or the secondary link based in part on a type of use and/or a link quality of the primary link.

In at least one aspect, a method is provided. The method can include determining, by a console, that a first measurement of a primary link between the console and a head wearable display is less than a first threshold. The first measurement can include a quality metric of the primary link. The method can include activating, by the console responsive to the first measurement being less than the first threshold, a secondary link between the console and the head wearable display. The method can include determining, by a console, whether a second measurement of the primary link between the console and the head wearable display is less than a second threshold. The second threshold can be less than the first threshold. The method can include transitioning, by the console when the second measurement is less than the second threshold, traffic on the primary link to the activated secondary link.

In some embodiments, the quality metric can include a signal to noise ratio of the primary link. The method can include maintaining, by the console, the traffic on the primary link when the second measurement is greater than the second threshold. The method can include performing, by the console responsive to the second measurement being less than the second threshold, measurements of the primary link at first determined intervals. The method can include performing, by the console responsive to a third measurement after the second measurement being less than the second threshold, additional measurements of the primary link at second determined intervals. In some embodiments, each of the second determined intervals can be greater than each of the first determined intervals.

The method can include determining, by the console, that a third measurement of the primary link is greater than a third threshold. The third threshold can be greater than the second threshold and less than the first threshold. The method can include identifying, by the console, a first candidate beam for the primary link. The method can include determining, by the console, a failure of the candidate beam. The method can include initiating, by the console, a determined period to suspend search for a second candidate beam for the primary link. The method can include transitioning, by the console, the traffic on the secondary link to the primary link using the first candidate beam, responsive to the third measurement being greater than the third threshold. The method can include de-activating, by the console, the secondary link responsive to a fourth measurement being greater than a fourth threshold. The fourth threshold can be greater than the first threshold. The method can include selecting, by the console, the primary link or the secondary link for the traffic between the console and the head wearable display according to a type of the traffic between the console and the head wearable display.

In at least one aspect, a console is provided. The console can include one or more processors. The one or more processors can be configured to determine that a first measurement of a primary link between the console and a head wearable display is less than a first threshold. The first measurement can correspond to a quality metric of the primary link. The one or more processors can be configured to activate, responsive to the first measurement being less than the first threshold, a secondary link between the console and the head wearable display. The one or more processors can be configured to determine whether a second measurement of the primary link between the console and the head wearable display is less than a second threshold. The second threshold can be less than the first threshold. The one or more processors can be configured to transition, when the second measurement is less than the second threshold, traffic on the primary link to the activated secondary link.

In some embodiments, the one or more processors can be configured to maintain the traffic on the primary link when the second measurement is greater than the second threshold. The one or more processors can be configured to perform, responsive to the second measurement being less than the second threshold, measurements of the primary link at first determined intervals. The one or more processors can be configured to perform, responsive to a third measurement after the second measurement being less than the second threshold, additional measurements of the primary link at second determined intervals. In some embodiments, each of the second determined intervals can be greater than each of the first determined intervals.

The one or more processors can be configured to determine that a third measurement of the primary link is greater than a third threshold. The third threshold can be greater than the second threshold and less than the first threshold. The one or more processors can be configured to identify a first candidate beam for the primary link. The one or more processors can be configured to determine a failure of the candidate beam. The one or more processors can be configured to initiate a determined period to suspend search for a second candidate beam for the primary link. The one or more processors can be configured to transition the traffic on the secondary link to the primary link using the first candidate beam, responsive to the third measurement being greater than the third threshold.

In at least one aspect, a non-transitory computer readable medium storing instructions is provided. The instructions when executed by one or more processors can cause the one or more processors to determine that a first measurement of a primary link between a console and a head wearable display is less than a first threshold. The first measurement can correspond to a quality metric of the primary link. The instructions when executed by one or more processors can cause the one or more processors to activate, responsive to the first measurement being less than the first threshold, a secondary link between the console and the head wearable display. The instructions when executed by one or more processors can cause the one or more processors to determine whether a second measurement of the primary link between the console and the head wearable display is less than a second threshold. The second threshold can be less than the first threshold. The instructions when executed by one or more processors can cause the one or more processors to transition, when the second measurement is less than the second threshold, traffic on the primary link to the activated secondary link.

In some embodiments, the instructions when executed by one or more processors can cause the one or more processors to select the primary link or the secondary link for the traffic between the console and the head wearable display according to a type of the traffic between the console and the head wearable display.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1A:
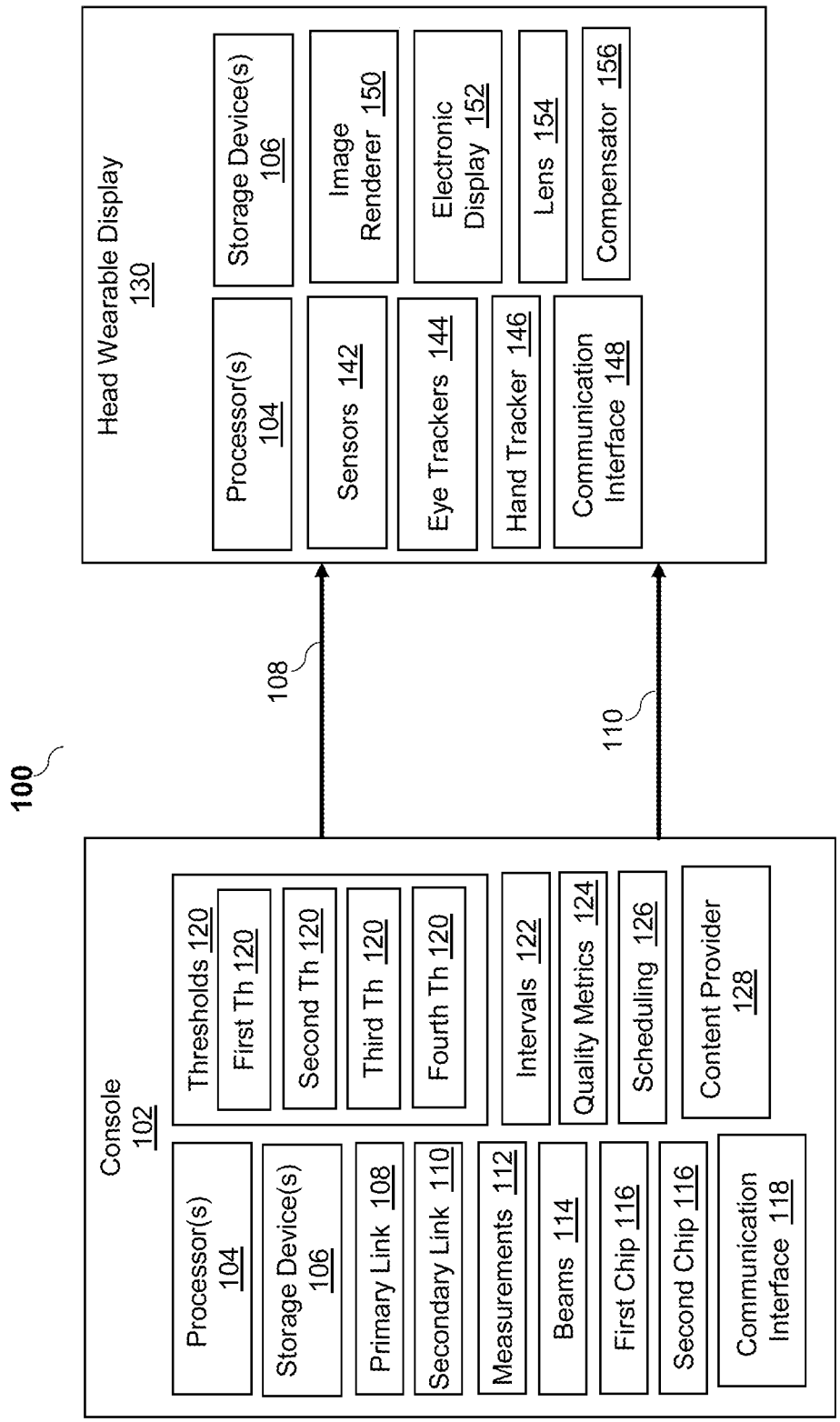
FIG. 1A is a block diagram of an embodiment of a system for selecting between a primary link and a secondary link for artificial reality applications, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

For purposes of reading the description of the various embodiments of the present invention below, the following descriptions of the sections of the specification and their respective contents may be helpful:

Section A describes embodiments of devices, systems and methods for selecting between a primary link and a secondary link for AR/VR applications.

Section B describes embodiments of a computing system.

A. Secondary Links for AR/VR Applications

The subject matter of this disclosure is directed to secondary links for artificial reality (e.g., AR, VR, mixed reality (MR)) applications. In some embodiments, the application addresses a wireless AR/VR/MR configuration of a goggle/glass (or head wearable display) paired with a puck (or console), where transmissions are primarily between the goggle and the puck using a 60 GHz wireless link (e.g., primary link). Under conditions involving severe blockage (e.g., due to body-induced loss, polarization mismatch), the 60 GHz link may be lost or severely degraded. To support such conditions, a secondary link can be activated and introduced to provide a certain level of minimum coverage as a back-up to the main 60 GHz link. The minimum coverage can include support for checking time, receiving text messages or emails, making/receiving a voice call, performing voice guidance/control, listening to online music, checking weather/stock information, for instance.

In some aspects, the secondary link can be configured to provide high availability and reliability (e.g., not require too much line-of-sight), provide sufficient range (e.g., 16 m×16 m), and may be always-on (e.g., standby) or can be turned on and established quickly. The secondary link can be low-power, low cost, and can support moderate-low throughput with good latency, e.g., for supporting basic texts and rendering, control commands, audio, and for controlling response, audio, etc. In various embodiments, the secondary link can comprise Bluetooth Classic, Bluetooth low energy (BLE), or low power WiFi. Based on the transmission rate, the option having an optimal power efficiency can be implemented. One embodiment of the solution involves both the primary and the secondary link sharing a single WiFi/BT chip/device on the puck, assuming that there is a limited or acceptable level of competition for traffic bandwidth between both links. Another embodiment can involve having a separate radio chip/device to support the secondary link, with BT being the preferred option to ensure good isolation from the main WiFi link.

In some embodiments, the systems, devices and methods described herein can include an inter-scheduling algorithm to activate primary and second links, and to switch between these links. In one embodiment, the inter-scheduling algorithm can include or involve a 2 stage inter-link switching and/or scheduling process, which includes an outer (or first) decision loop where the link is chosen or determined based on use case, e.g., choose primary link if full use case (e.g., supporting full AR experience) is required, and choose secondary link if only minimum use case is required. In an inner (or second) decision loop, inter-link scheduling can be based on link quality. For example, if the primary link quality is below a certain threshold, the system (head wearable display and/or console) can bring up the secondary link if the primary link quality is still down, and can move traffic to the secondary link with reduced user experience. Periodic measurement can be performed on the primary link, and switching can occur back to the primary link if the link condition of the primary link backs to a certain acceptable level.

Referring now to FIG. 1A, an example artificial reality system 100 for selecting between a primary link and a secondary link for AR/VR applications is provided. In brief overview, the system 100 can include a console 102 and a head wearable display 130. The head wearable display 130 (e.g., goggle, glass, head mounted device) can pair with the console 102 (e.g., puck) to communicate or transfer data between the head wearable display 130 and the console 102, for example, for at least one user session for a user of the head wearable display 130. The user session can include a VR experience, AR experience or MR experience via the head wearable display 130. The console 102 and/or the head wearable display 130 can determine to communicate through a primary link 108 and/or a secondary link 110 based in part of a type of use (e.g., type of traffic, priority of traffic) and/or a quality of link between the console 102 and the head wearable display 130.

In some embodiments, the artificial reality system environment 100 includes a head wearable display 130 worn by a user, and a console 102 providing content of artificial reality to the head wearable display 130. The head wearable display 130 may detect its location and/or orientation of the head wearable display 130, and provide the detected location/or orientation of the head wearable display 130 to the console 102. The console 102 may generate image data indicating an image of the artificial reality according to the detected location and/or orientation of the head wearable display 130 as well as a user input for the artificial reality, and transmit the image data to the head wearable display 130 for presentation. In some embodiments, the artificial reality system environment 100 includes more, fewer, or different components than shown in FIG. 1A. In some embodiments, functionality of one or more components of the artificial reality system environment 100 can be distributed among the components in a different manner than is described here. For example, some of the functionality of the console 102 may be performed by the head wearable display 130. For example, some of the functionality of the head wearable display 130 may be performed by the console 102. In some embodiments, the console 102 is integrated as part of the head wearable display 130.

Figure 4:
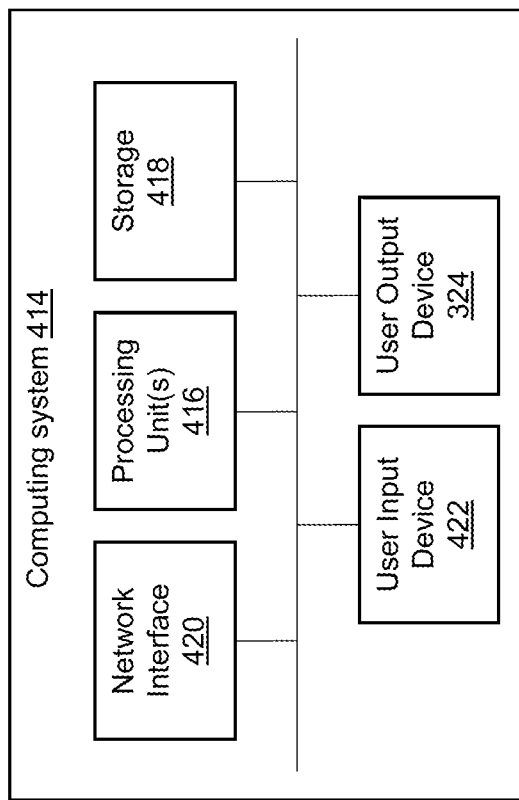
FIG. 4 is a block diagram of a computing environment according to an example implementation of the present disclosure.

Various components and elements of the artificial reality system 100 may be implemented on or using components or elements of the computing environment shown in FIG. 4 and subsequently described. For instance, the console 102 and head wearable display 130 may include or incorporate a computing system similar to the computing system 414 shown in FIG. 4 and subsequently described. The console 102 and head wearable display 130 may include one or more processing unit(s) 416, storage 418, a network interface 420, user input device 422, and/or user output device 424.

The console 102 can include a computing system or WiFi device. In some embodiments, the console 102 can be implemented, for example, as a wearable computing device (e.g., smart watch, smart eyeglasses, head wearable display), smartphone, other mobile phone, device (e.g., consumer device), desktop computer, laptop computer, a virtual reality (VR) puck, a VR personal computer (PC), VR computing device, a head mounted device, or implemented with distributed computing devices. The console 102 can be implemented to provide VR, augmented reality (AR), and/or mixed reality (MR) experience. In some embodiments, the console 102 can include conventional, specialized or custom computer components such as processors 104, a storage device 106, a network interface, a user input device, and/or a user output device. In embodiments, the console 102 may include some elements of the device shown in FIG. 4 and subsequently described.

The head wearable display 130 can include a computing system or WiFi device. A head wearable display (HWD) may be referred to as, include, or be part of a head mounted display (HMD), head mounted device (HMD), head wearable device (HWD), head worn display (HWD) or head worn device (HWD). In some embodiments, the head wearable display 130 can be implemented, for example, as a wearable computing device (e.g., smart watch, smart eyeglasses, head wearable display), smartphone, other mobile phone, device (e.g., consumer device), desktop computer, laptop computer, a virtual reality (VR) puck, a VR personal computer (PC), VR computing device, a head mounted device, or implemented with distributed computing devices. The head wearable display 130 can be implemented to provide VR, augmented reality (AR), and/or mixed reality (MR) experience to a user (e.g., wearing the display) of the head wearable display 130. In some embodiments, the head wearable display 130 can include conventional, specialized or custom computer components such as processors 104, a storage device 106, a network interface, a user input device, and/or a user output device. In embodiments, the head wearable display 130 may include some elements of the device shown in FIG. 4 and subsequently described.

The console 102 and the head wearable display 130 can include one or more processors 104. The one or more processors 104 can include any logic, circuitry and/or processing component (e.g., a microprocessor) for pre-processing input data for the console 102 and/or head wearable display 130, and/or for post-processing output data for the console 102 and/or head wearable display 130. The one or more processors 104 can provide logic, circuitry, processing component and/or functionality for configuring, controlling and/or managing one or more operations of the console 102 and/or head wearable display 130. For instance, a processor 104 may receive data and metrics, including but not limited to, one or more measurements 112 of a primary link 108 and/or secondary link 110 between the console 102 and the head wearable display 130.

The console 102 and head wearable display 130 can include a storage device 106. The storage device 106 can be designed or implemented to store, hold or maintain any type or form of data associated with the console 102 and head wearable display 130. For example, the console 102 and the head wearable display 130 can store one or more measurements 112, thresholds 120 and quality metrics 124. The storage device 106 can include a static random access memory (SRAM) or internal SRAM, internal to the console 102. In embodiments, the storage device 106 can be included within an integrated circuit of the console 102. The storage device 106 can include a memory (e.g., memory, memory unit, storage device, etc.). The memory may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an example embodiment, the memory is communicably connected to the processor 104 via a processing circuit and includes computer code for executing (e.g., by the processing circuit and/or the processor) the one or more processes or methods (e.g., method 300) described herein.

The console 102 can establish one or more primary links 108 to the head wearable display 130. In some embodiments, the head wearable display 130 can establish one or more primary links 108 to the console 102. The primary link 108 can include a connection (e.g., wireless connection), session (e.g., user and/or application session) and/or channel established between the console 102 and the head wearable display 130. The primary link 108 can include a high capacity, low latency and power saving connection established between the console 102 and the head wearable display 130. In some embodiments, the primary link can include, but not limited to, a link using millimeter wave spectrum or frequency ranging from 30 GHz to 100 GHz. In some embodiments, the primary link 108 can include, but not limited to, a 60 GHz frequency connection (e.g., 60 GHz WiFi, IEEE 802.11ay/ad). The primary link 108 can be used to provide or support a full VR experience, AR experience or MR experience for a user of the head wearable display 130.

The console 102 can establish one or more secondary links 110 to the head wearable display 130. In some embodiments, the head wearable display 130 can establish one or more secondary links 110 to the console 102. The secondary link 110 can include a connection (e.g., wireless connection), session and/or channel established between the console 102 and the head wearable display 130. The secondary link 110 can include a high availability, high reliability and/or low power consumption connection established between the console 102 and the head wearable display 130. In some embodiments, the secondary link 110 can be configured to provide sufficient range (e.g., 16 m×16 m), and can be always-on (e.g., in at least standby mode) or can be turned on and established quickly. The secondary link 110 can be configured to support moderate-low throughput with good latency. For example, the secondary link 110 can be activated for or used to support minimum use cases such as, but not limited to, checking time, receiving text messages or emails, making/receiving a voice call, performing voice guidance/control, listening to online music, checking weather/stock information.

The secondary link 110 can be established using different forms of short-range wireless communications technologies including, but not limited to, Bluetooth (BT), Bluetooth low energy (BLE), and/or low power WiFi. In some embodiments, the secondary link 110 is based in part on properties of a connection or channel between the console 102 and the head wearable display 130. For example, the secondary link 110 can be established using BT for connection speeds in a range from 1 Megabits per second (Mbps) to 2 Mbps. The secondary link 110 can be established using low power WiFi for connection speeds in a range from 2 Mbps to 10 Mbps. In some embodiments, the secondary link 110 can be established using 802.11ax standards for connection speeds at or greater than 24 Mbps.

The console 102 and/or the head wearable display 130 can take or perform measurements 112 on the primary link 108 and/or the secondary link 110 to determine various characteristics or properties of the links (e.g., status, quality, level of traffic). The measurements 112 can include a status measurement (e.g., on, off, activated), an availability of the respective link, a connection speed, a signal to noise ratio, a latency value, a power consumption value and/or a reliability of the respective link. In some embodiments, the measurements 112 can include a quality measurement of the respective link. For example, the console 102 and/or the head wearable display 130 can take or perform measurements 112 on the primary link 108 and/or the secondary link 110 to determine one or more quality metrics 124 for the primary link 108 and/or secondary link 110. The quality metric 124 can include a signal to noise ratio and/or a modulation and coding scheme (MCS) value of the primary link 108 and/or secondary link 110 to determine if the quality of the respective link is greater than a particular threshold 120.

The console 102 and/or head wearable display 130 can generate or establish one or more thresholds 120 to determine if a link can support a particular type of use and/or to verify a quality of the link. For example, in some embodiments, responsive to a measurement 112 of the primary link being less than a threshold 120, traffic between the console 102 and the head wearable display 130 can be transitioned from the primary link 108 to the secondary link 110. In some embodiments, responsive to a measurement 112 of the primary link being greater than a threshold 120, traffic between the console 102 and the head wearable display 130 can be transitioned from the secondary link 110 to the primary link 108. The thresholds 120 can include or correspond to different quality metrics (e.g., signal to noise ratio values) of the primary link 108 or secondary link 110 to determine if the respective link can provide or support one or more different types of uses or levels of service to a user of the head wearable display 130. The console 102 and/or head wearable display 130 can generate or establish a single threshold 120 or a plurality of thresholds 120.

The console 102 and/or head wearable display 130 can generate or establish one or more intervals 122. The intervals 122 can include or correspond to a particular time period to take or perform measurements 112 of the primary link 108 and/or secondary link 110. The intervals 122 can include a time period, a time range, and/or a time value. In some embodiments, the intervals 122 can include or correspond to a length of time or a duration between different measurements 112 and the intervals can have different time values. For example, a first determined interval 122 can be different (e.g., shorter time period, longer time period) from a second determined interval 122.

The primary link 108 and/or secondary link 110 can include one or more beams 114 (e.g., candidate beams 114) that correspond to a communication path (e.g., transmission path, signal path) between the console 102 and the head wearable display 130. In some embodiments, the console 102 and/or head wearable display 130 can select at least one beam 114 or candidate beam 114 from a plurality of available beams 114 to support the primary link 108 or the secondary link 110 between the console 102 and/or head wearable display 130. In some embodiments, the console 102 and/or head wearable display 130 can perform or use beamforming to select at least one beam 114 or candidate beam 114 to support the primary link 108 or the secondary link 110 between the console 102 and/or head wearable display 130.

The console 102 can include one or more chips 116 to support the primary link 108 and the secondary link 110. The chips 116 can include, but not limited to, an integrated circuit or radio frequency integrated circuit embedded or disposed within the console 102 to support the primary link 108 and the secondary link 110. In some embodiments, the primary link 108 and the secondary link 110 can share a functionality and/or processes of a single chip 116. For example, in one embodiment, the console 102 can include a first chip 116 configured to support a WiFi connection and a BT connection at the console 102 for the primary link 108 and the secondary link 110, respectively. The first chip can support an internet link and the secondary link 110 (e.g., intra-link connection) from the console 102. In some embodiments, the console 102 can include a first chip 116 to support the primary link 108 and a second, different chip 116 to support the secondary link 110. For example, the console 102 can include a first chip 116 configured to support a WiFi connection for the primary link 108 and a second chip 116 to support a BT connection for the secondary link 110.

In some embodiments, the head wearable display 130 is an electronic component that can be worn by a user and can present or provide an artificial reality experience to the user. The head wearable display 130 may render one or more images, video, audio, or some combination thereof to provide the artificial reality experience to the user. In some embodiments, audio is presented via an external device (e.g., speakers and/or headphones) that receives audio information from the head wearable display 130, the console 102, or both, and presents audio based on the audio information. In some embodiments, the head wearable display 130 includes sensors 142, eye trackers 144, a hand tracker 146, a communication interface 148, an image renderer 150, an electronic display 152, a lens 154, and a compensator 156. These components may operate together to detect a location of the head wearable display 130 and a gaze direction of the user wearing the head wearable display 130, and render an image of a view within the artificial reality corresponding to the detected location and/or orientation of the head wearable display 130. In other embodiments, the head wearable display 130 includes more, fewer, or different components than shown in FIG. 1A.

In some embodiments, the sensors 142 include electronic components or a combination of electronic components and software components that detect a location and an orientation of the head wearable display 130. Examples of the sensors 142 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 142 detect the translational movement and the rotational movement, and determine an orientation and location of the head wearable display 130. In one aspect, the sensors 142 can detect the translational movement and the rotational movement with respect to a previous orientation and location of the head wearable display 130, and determine a new orientation and/or location of the head wearable display 130 by accumulating or integrating the detected translational movement and/or the rotational movement. Assuming for an example that the head wearable display 130 is oriented in a direction 25 degrees from a reference direction, in response to detecting that the head wearable display 130 has rotated 20 degrees, the sensors 142 may determine that the head wearable display 130 now faces or is oriented in a direction 45 degrees from the reference direction. Assuming for another example that the head wearable display 130 was located two feet away from a reference point in a first direction, in response to detecting that the head wearable display 130 has moved three feet in a second direction, the sensors 142 may determine that the head wearable display 130 is now located at a vector multiplication of the two feet in the first direction and the three feet in the second direction.

In some embodiments, the eye trackers 144 include electronic components or a combination of electronic components and software components that determine a gaze direction of the user of the head wearable display 130. In some embodiments, the head wearable display 130, the console 102 or a combination of them may incorporate the gaze direction of the user of the head wearable display 130 to generate image data for artificial reality. In some embodiments, the eye trackers 144 include two eye trackers, where each eye tracker 144 captures an image of a corresponding eye and determines a gaze direction of the eye. In one example, the eye tracker 144 determines an angular rotation of the eye, a translation of the eye, a change in the torsion of the eye, and/or a change in shape of the eye, according to the captured image of the eye, and determines the relative gaze direction with respect to the head wearable display 130, according to the determined angular rotation, translation and the change in the torsion of the eye. In one approach, the eye tracker 144 may shine or project a predetermined reference or structured pattern on a portion of the eye, and capture an image of the eye to analyze the pattern projected on the portion of the eye to determine a relative gaze direction of the eye with respect to the head wearable display 130. In some embodiments, the eye trackers 144 incorporate the orientation of the head wearable display 130 and the relative gaze direction with respect to the head wearable display 130 to determine a gate direction of the user. Assuming for an example that the head wearable display 130 is oriented at a direction 30 degrees from a reference direction, and the relative gaze direction of the head wearable display 130 is −10 degrees (or 350 degrees) with respect to the head wearable display 130, the eye trackers 144 may determine that the gaze direction of the user is 20 degrees from the reference direction. In some embodiments, a user of the head wearable display 130 can configure the head wearable display 130 (e.g., via user settings) to enable or disable the eye trackers 144. In some embodiments, a user of the head wearable display 130 is prompted to enable or disable the eye trackers 144.

In some embodiments, the hand tracker 146 includes an electronic component or a combination of an electronic component and a software component that tracks a hand of the user. In some embodiments, the hand tracker 146 includes or is coupled to an imaging sensor (e.g., camera) and an image processor that can detect a shape, a location and an orientation of the hand. The hand tracker 146 may generate hand tracking measurements indicating the detected shape, location and orientation of the hand.

In some embodiments, the communication interface 148 includes an electronic component or a combination of an electronic component and a software component that communicates with the console 102. The communication interface 148 may communicate with a communication interface 118 of the console 102 through a communication link. The communication link may be a wireless link. Examples of the wireless link can include a cellular communication link, a near field communication link, Wi-Fi, Bluetooth, 60 GHz wireless link, or any communication wireless communication link. Through the communication link, the communication interface 148 may transmit to the console 102 data indicating the determined location and/or orientation of the head wearable display 130, the determined gaze direction of the user, and/or hand tracking measurement. Moreover, through the communication link, the communication interface 148 may receive from the console 102 image data indicating or corresponding to an image to be rendered and additional data associated with the image.

In some embodiments, the image renderer 150 includes an electronic component or a combination of an electronic component and a software component that generates one or more images for display, for example, according to a change in view of the space of the artificial reality. In some embodiments, the image renderer 150 is implemented as a processor (or a graphical processing unit (GPU)) that executes instructions to perform various functions described herein. The image renderer 150 may receive, through the communication interface 148, image data describing an image of artificial reality to be rendered and additional data associated with the image, and render the image through the electronic display 152. In some embodiments, the image data from the console 102 may be encoded, and the image renderer 150 may decode the image data to render the image. In some embodiments, the image renderer 150 receives, from the console 102 in additional data, object information indicating virtual objects in the artificial reality space and depth information indicating depth (or distances from the head wearable display 130) of the virtual objects. In one aspect, according to the image of the artificial reality, object information, depth information from the console 102, and/or updated sensor measurements from the sensors 142, the image renderer 150 may perform shading, reprojection, and/or blending to update the image of the artificial reality to correspond to the updated location and/or orientation of the head wearable display 130. Assuming that a user rotated his head after the initial sensor measurements, rather than recreating the entire image responsive to the updated sensor measurements, the image renderer 150 may generate a small portion (e.g., 10%) of an image corresponding to an updated view within the artificial reality according to the updated sensor measurements, and append the portion to the image in the image data from the console 102 through reprojection. The image renderer 150 may perform shading and/or blending on the appended edges. Hence, without recreating the image of the artificial reality according to the updated sensor measurements, the image renderer 150 can generate the image of the artificial reality. In some embodiments, the image renderer 150 receives hand model data indicating a shape, a location and an orientation of a hand model corresponding to the hand of the user, and overlay the hand model on the image of the artificial reality. Such hand model may be presented as a visual feedback to allow a user to provide various interactions within the artificial reality.

In some embodiments, the electronic display 152 is an electronic component that displays an image. The electronic display 152 may, for example, be a liquid crystal display or an organic light emitting diode display. The electronic display 152 may be a transparent display that allows the user to see through. In some embodiments, when the head wearable display 130 is worn by a user, the electronic display 152 is located proximate (e.g., less than 3 inches) to the user's eyes. In one aspect, the electronic display 152 emits or projects light towards the user's eyes according to image generated by the image renderer 150.

In some embodiments, the lens 154 is a mechanical component that alters received light from the electronic display 152. The lens 154 may magnify the light from the electronic display 152, and correct for optical error associated with the light. The lens 154 may be a Fresnel lens, a convex lens, a concave lens, a filter, or any suitable optical component that alters the light from the electronic display 152. Through the lens 154, light from the electronic display 152 can reach the pupils, such that the user can see the image displayed by the electronic display 152, despite the close proximity of the electronic display 152 to the eyes.

In some embodiments, the compensator 156 includes an electronic component or a combination of an electronic component and a software component that performs compensation to compensate for any distortions or aberrations. In one aspect, the lens 154 introduces optical aberrations such as a chromatic aberration, a pin-cushion distortion, barrel distortion, etc. The compensator 156 may determine a compensation (e.g., predistortion) to apply to the image to be rendered from the image renderer 150 to compensate for the distortions caused by the lens 154, and apply the determined compensation to the image from the image renderer 150. The compensator 156 may provide the pre-distorted image to the electronic display 152.

In some embodiments, the console 102 is an electronic component or a combination of an electronic component and a software component that provides content to be rendered to the head wearable display 130. In one aspect, the console 102 includes a communication interface 118 and a content provider 128. These components may operate together to determine a view (e.g., a FOV of the user) of the artificial reality corresponding to the location of the head wearable display 130 and the gaze direction of the user of the head wearable display 130, and can generate image data indicating an image of the artificial reality corresponding to the determined view. In addition, these components may operate together to generate additional data associated with the image. Additional data may be information associated with presenting or rendering the artificial reality other than the image of the artificial reality. Examples of additional data include, hand model data, mapping information for translating a location and an orientation of the head wearable display 130 in a physical space into a virtual space (or simultaneous localization and mapping (SLAM) data), motion vector information, depth information, edge information, object information, etc. The console 102 may provide the image data and the additional data to the head wearable display 130 for presentation of the artificial reality. In other embodiments, the console 102 includes more, fewer, or different components than shown in FIG. 1A. In some embodiments, the console 102 is integrated as part of the head wearable display 130.

In some embodiments, the communication interface 118 is an electronic component or a combination of an electronic component and a software component that communicates with the head wearable display 130. The communication interface 118 may be a counterpart component to the communication interface 148 to communicate with a communication interface 118 of the console 102 through a communication link (e.g., wireless link). Through the communication link, the communication interface 118 may receive from the head wearable display 130 data indicating the determined location and/or orientation of the head wearable display 130, the determined gaze direction of the user, and the hand tracking measurement. Moreover, through the communication link, the communication interface 118 may transmit to the head wearable display 130 image data describing an image to be rendered and additional data associated with the image of the artificial reality.

The content provider 128 can include or correspond to a component that generates content to be rendered according to the location and/or orientation of the head wearable display 130. In some embodiments, the content provider 128 may incorporate the gaze direction of the user of the head wearable display 130, and a user interaction in the artificial reality based on hand tracking measurements to generate the content to be rendered. In one aspect, the content provider 128 determines a view of the artificial reality according to the location and/or orientation of the head wearable display 130. For example, the content provider 128 maps the location of the head wearable display 130 in a physical space to a location within an artificial reality space, and determines a view of the artificial reality space along a direction corresponding to the mapped orientation from the mapped location in the artificial reality space. The content provider 128 may generate image data describing an image of the determined view of the artificial reality space, and transmit the image data to the head wearable display 130 through the communication interface 118. The content provider 128 may also generate a hand model corresponding to a hand of a user of the head wearable display 130 according to the hand tracking measurement, and generate hand model data indicating a shape, a location, and an orientation of the hand model in the artificial reality space. In some embodiments, the content provider 128 may generate additional data including motion vector information, depth information, edge information, object information, hand model data, etc., associated with the image, and transmit the additional data together with the image data to the head wearable display 130 through the communication interface 118. The content provider 128 may encode the image data describing the image, and can transmit the encoded data to the head wearable display 130. In some embodiments, the content provider 128 generates and provides the image data to the head wearable display 130 periodically (e.g., every 11 ms). In one aspect, the communication interface 118 can adaptively transmit the additional data to the head wearable display 130 as described below with respect to FIGS. 2A through 4.

Figure 1B:
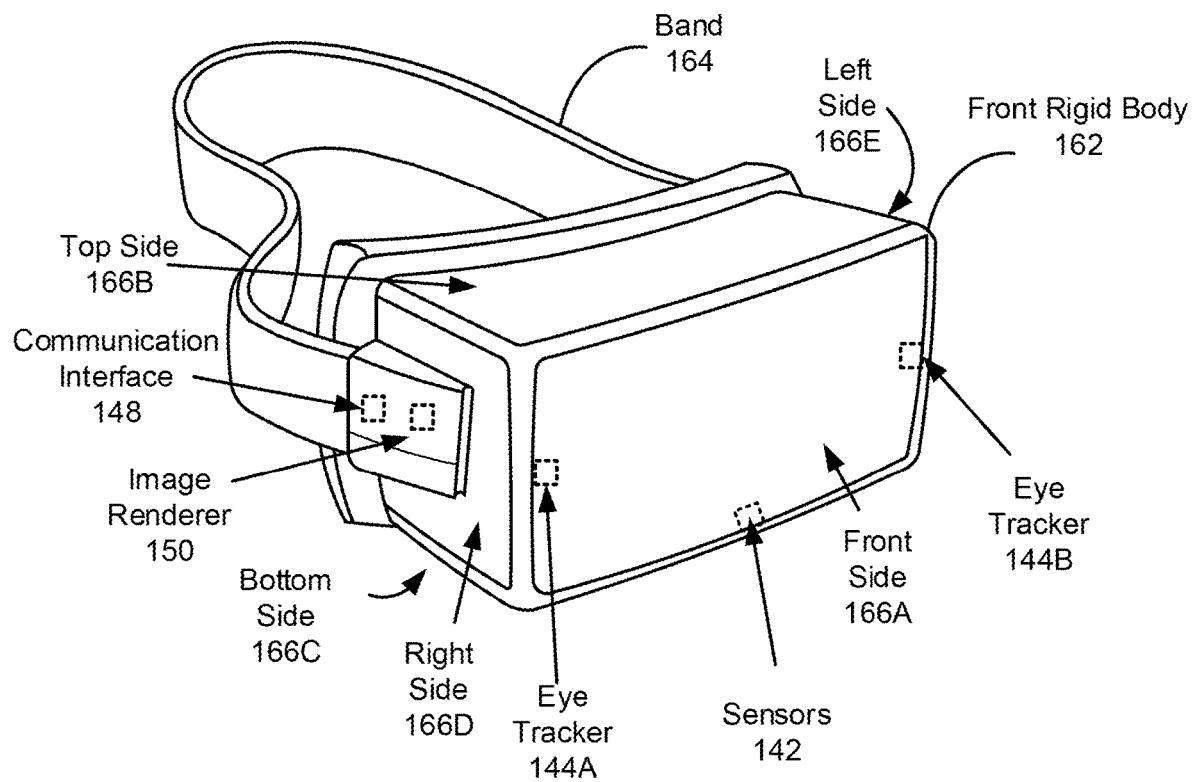
FIG. 1B is a diagram of a head wearable display, according to an example implementation of the present disclosure.

FIG. 1B is a diagram 160 of a head wearable display 130, in accordance with an example embodiment. In some embodiments, the head wearable display 130 includes a front rigid body 162 and a band 164. The front rigid body 162 includes the electronic display 152 (not shown in FIG. 1B), the lens 154 (not shown in FIG. 1B), the sensors 142, the eye trackers 144A, 144B, the communication interface 148, and the image renderer 150. In the embodiment shown by FIG. 1B, the communication interface 148, the image renderer 150, and the sensors 142 are located within the front rigid body 162, and may not visible to the user. In other embodiments, the head wearable display 130 has a different configuration than shown in FIG. 1B. For example, the communication interface 148, the image renderer 150, the eye trackers 144A, 144B, and/or the sensors 142 may be in different locations than shown in FIG. 1B.

Figure 2A:
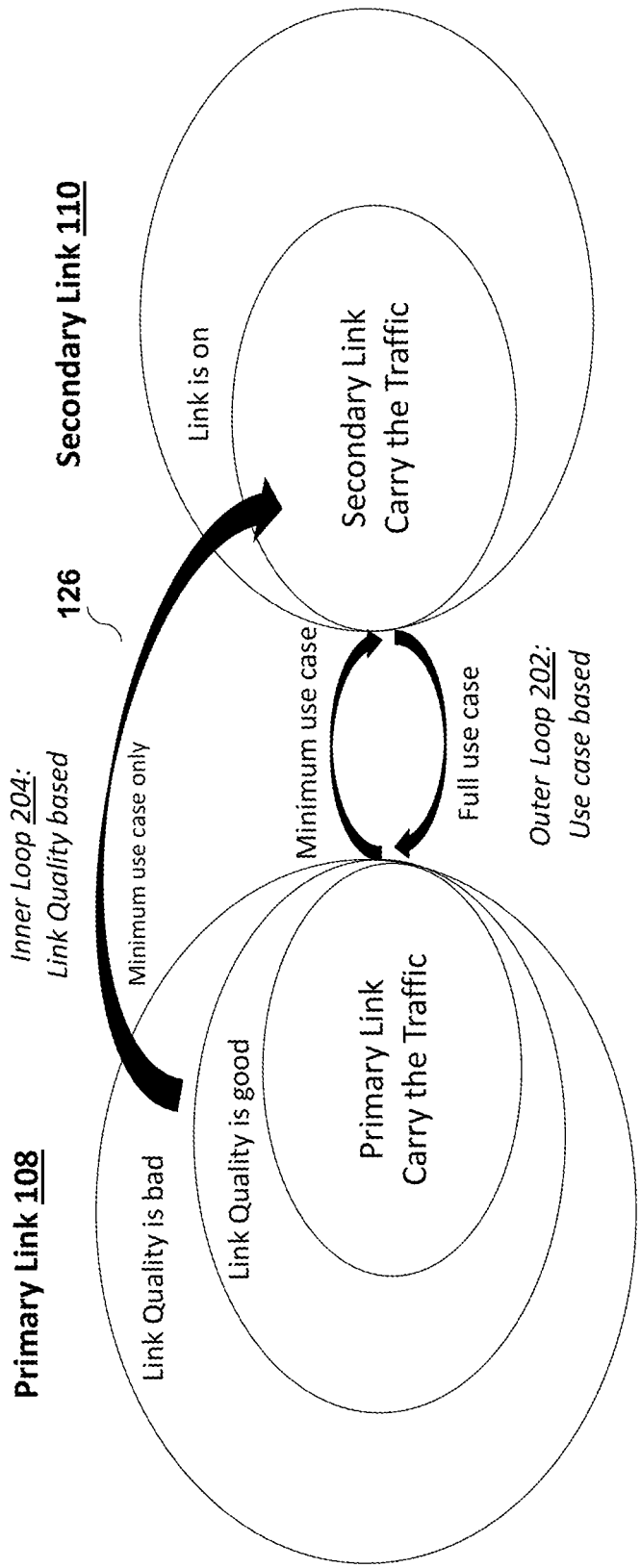
FIG. 2A is a diagram of an inter-scheduling algorithm for selecting between a primary link and a secondary link for AR/VR applications, according to an example implementation of the present disclosure.

Now referring to FIG. 2A, a diagram 200 of an inter-scheduling algorithm 126 is depicted. The console 102 can include or execute an inter-scheduling algorithm 126 to determine whether to use a primary link 108 or a secondary link 110 for a session between the console 102 and the head wearable display 130. The console 102 can include or execute an inter-scheduling algorithm 126 to determine whether to activate and/or switch between the primary link 108 and secondary link 110, in response to a link quality of the primary link 108.

The inter-scheduling algorithm 126 can include a two-stage inter-link switching and scheduling process, having an outer/first decision loop 202 and an inner/second decision loop 204. The outer/first decision loop 202 can for instance make a determination between the primary link 108 and the secondary link 110 based in part on a use case or type of use. In one embodiment, the console 102 can execute the outer decision loop 202 of the inter-scheduling algorithm 126 to select the primary link 108 for a full AR experience and select the secondary link 110 for a minimum use case. The inner decision loop 204 can make a determination between the primary link 108 and the secondary link 110, e.g., on which link to use or switch to, based in part on a link quality (e.g., signal to noise ratio level) of the primary link 108. In one embodiment, the console 102 can execute the inner decision loop 204 of the inter-scheduling algorithm 126 to determine whether to activate the secondary link 110 and/or transition traffic to from the primary link 108 to the secondary link 110 in response to one or more measurements of the primary link 108 indicating a link quality of the primary link 108.

Figure 2B:
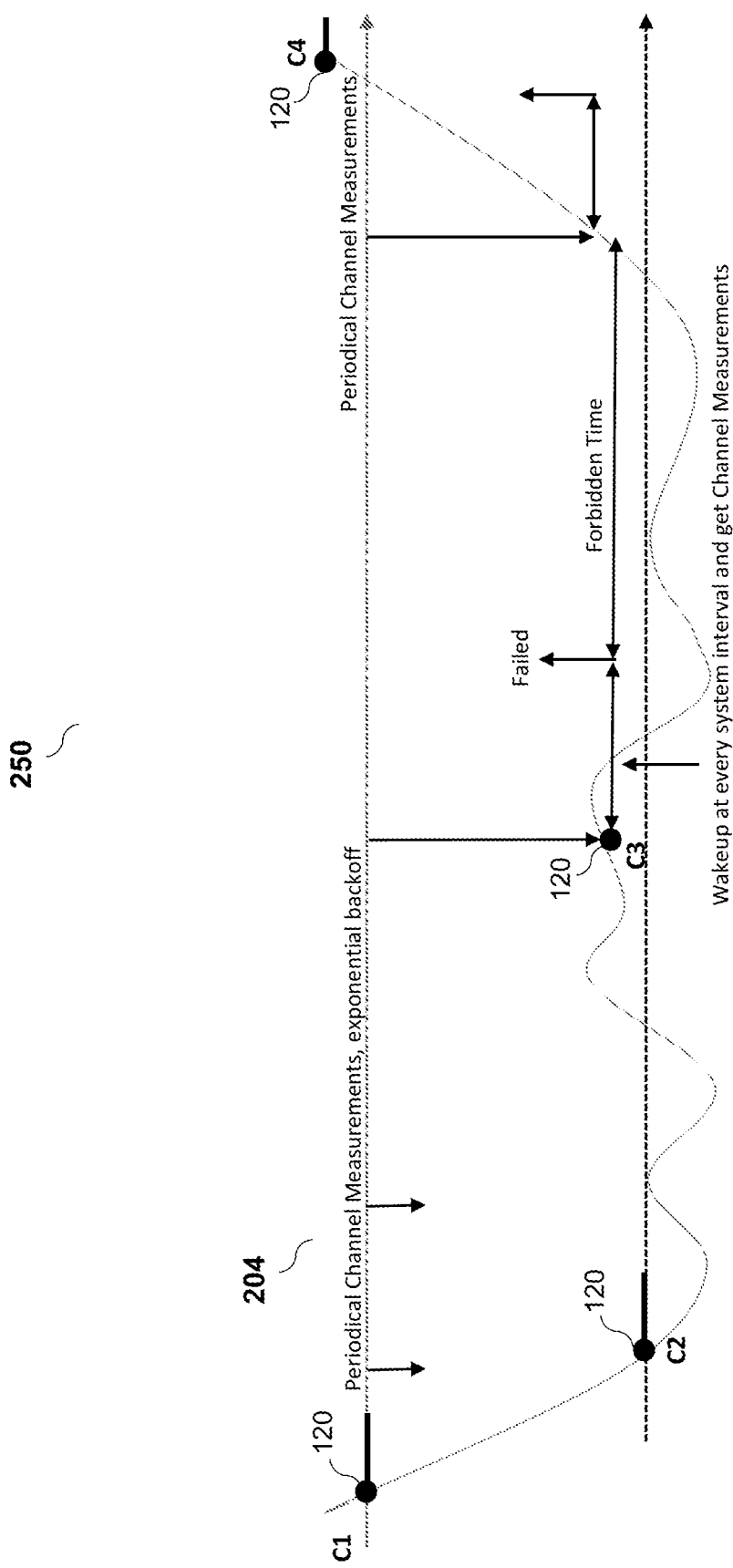
FIG. 2B is a diagram of an inner decision loop for selecting between a primary link and a secondary link using link quality AR/VR applications, according to an example implementation of the present disclosure.
Figure 3A:
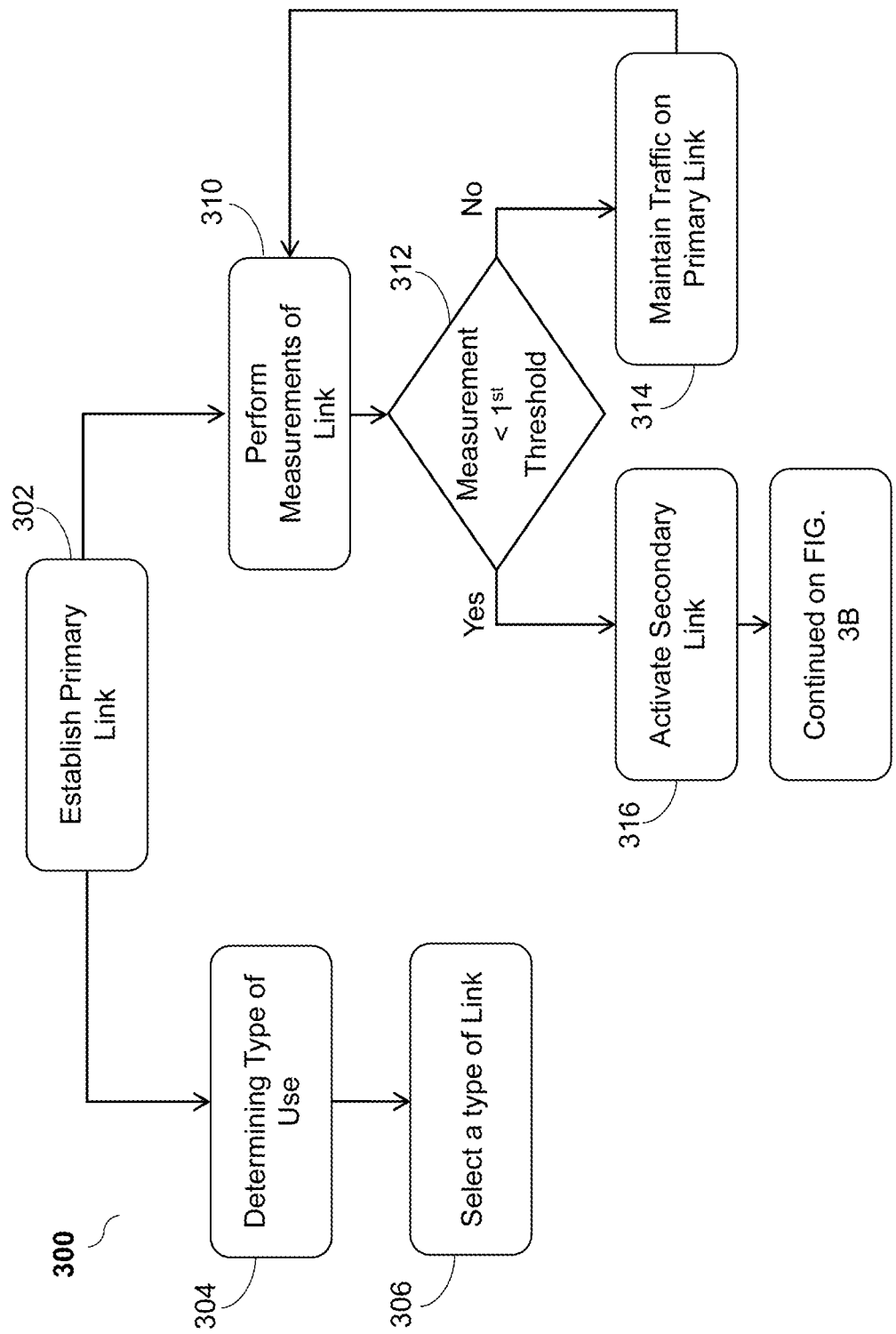
FIGS. 3A-3E include a flow chart illustrating a process or method for selecting between a primary link and a secondary link for AR/VR applications, according to an example implementation of the present disclosure.
Figure 3B:
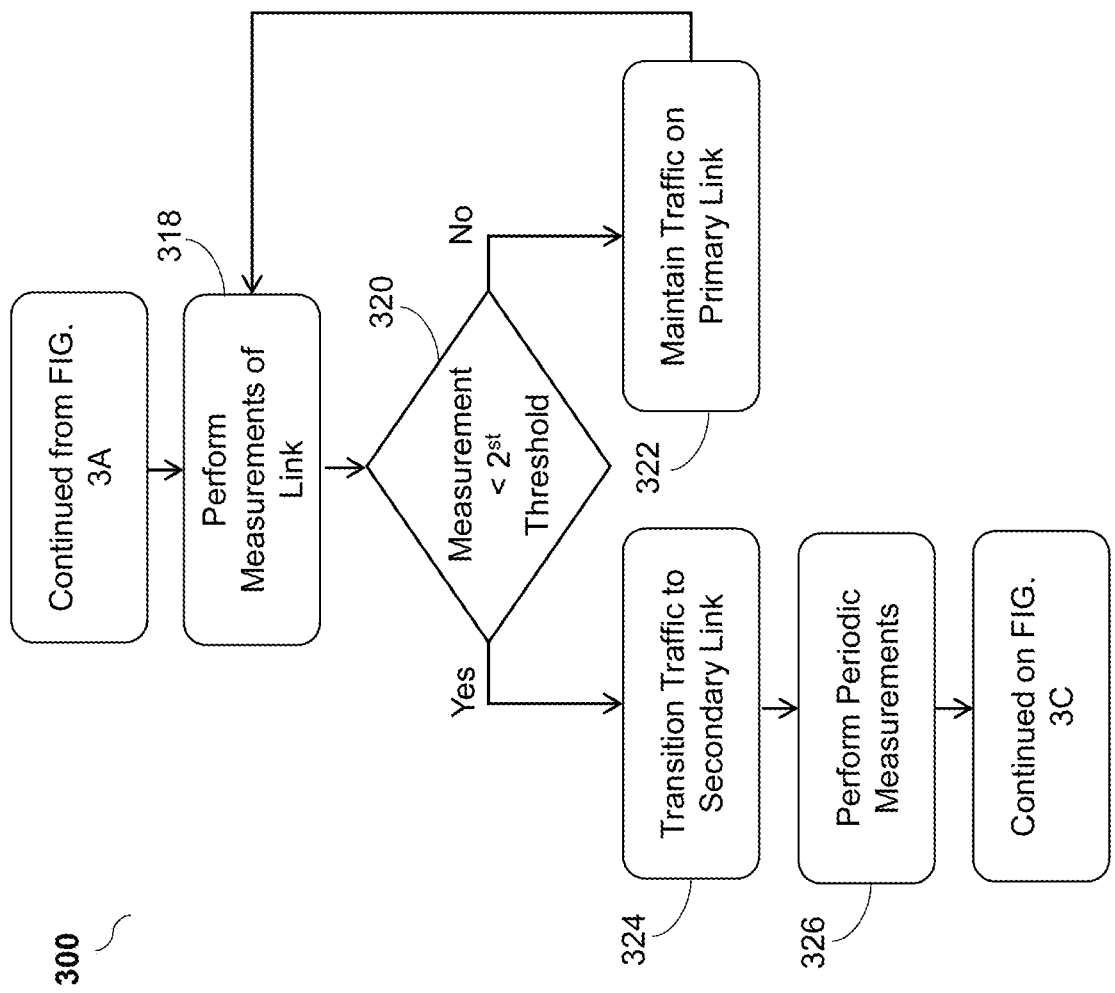
Figure 3C:
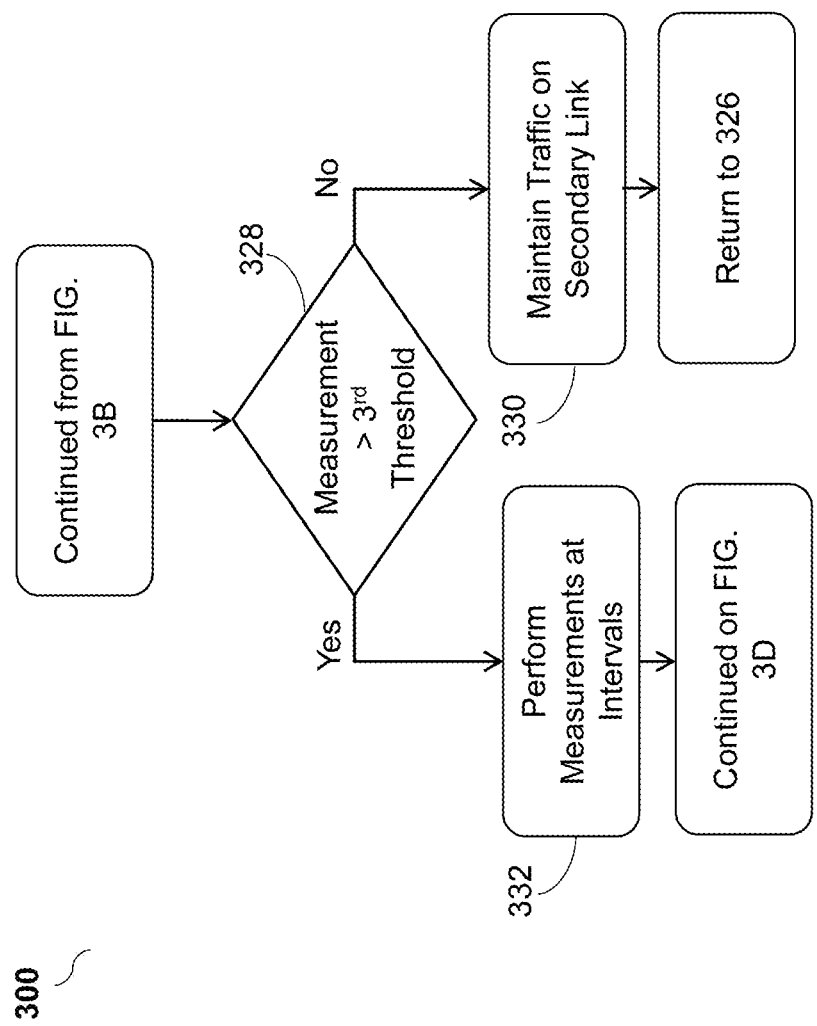
Figure 3D:
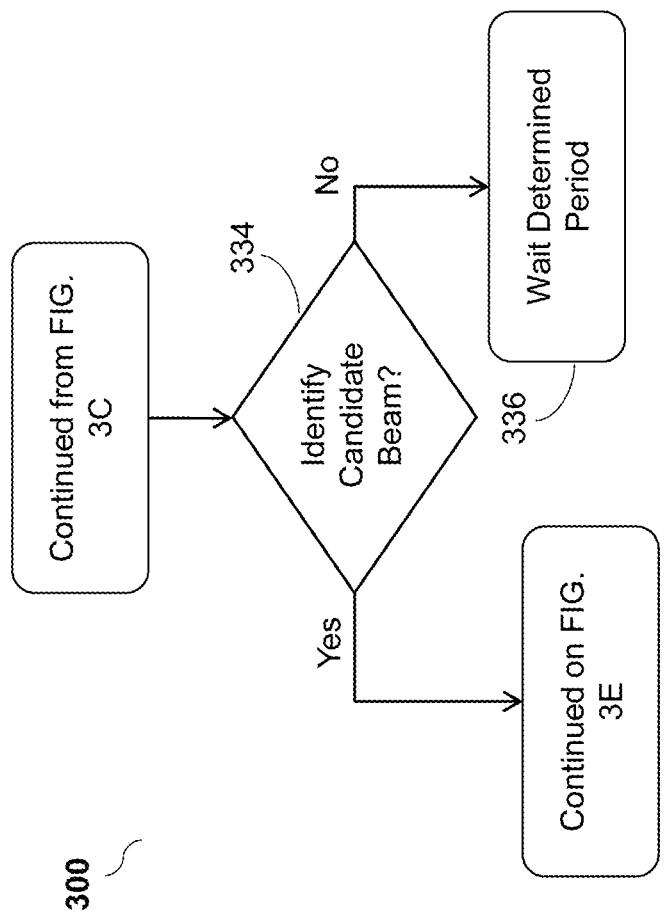
Figure 3E:
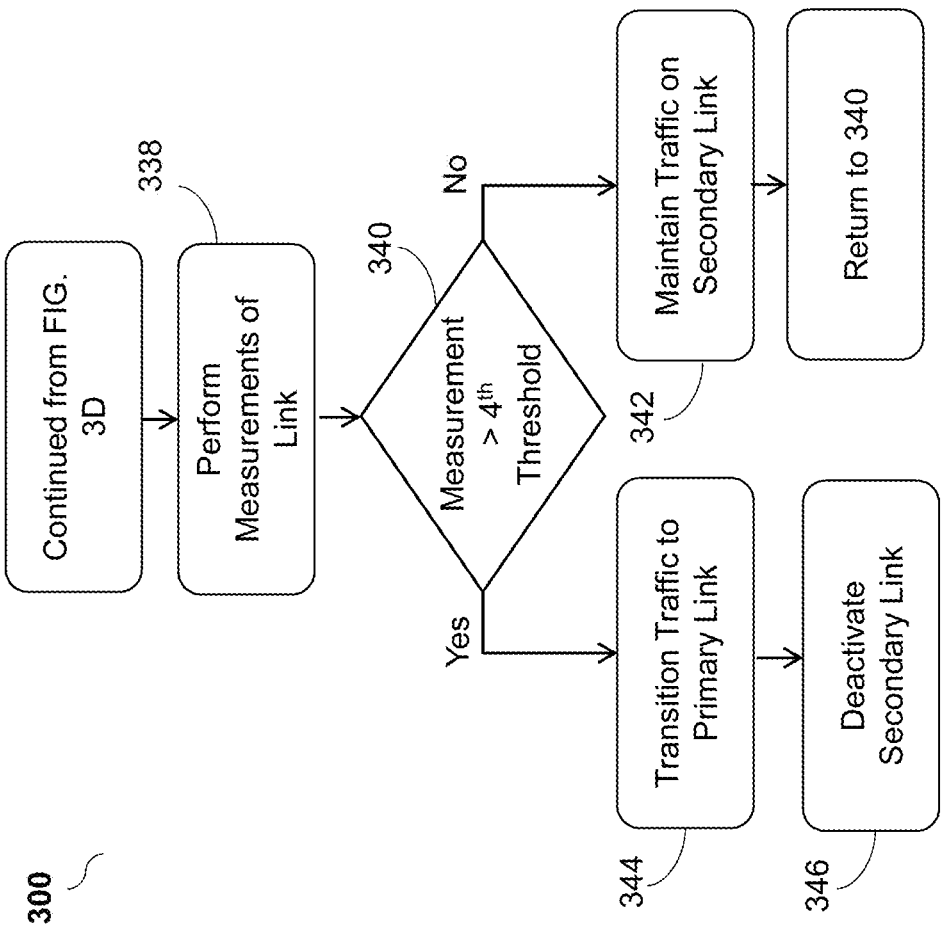

Now referring to FIG. 2B, a diagram 250 of multiple thresholds used during one example embodiment of the inner decision loop 204 of the inter-scheduling algorithm 126 is depicted. In some embodiments, the inner decision loop 204 can use or apply multiple thresholds 120 (e.g., quality thresholds, signal to noise ration thresholds) to monitor and verify a quality of the primary link 108. The console 102 can execute the inner decision loop 204 by providing or communicating instruction(s) or message(s) based on and/or including one or more measurements 112 of the primary link 108, to the inter-scheduling algorithm 126. In some embodiments, the inter-scheduling algorithm 126 can determine whether the primary link 108 can support a current session between the console 102 and the head wearable display 130 by applying one or more thresholds 120 to the measurements 112 of the primary link 108.

In some embodiments, the inner decision loop 204 can include four thresholds 120. For example, the inner decision loop 204 can include a first threshold 120 (C1), a second threshold 120 (C2), a third threshold 120 (C3), and a fourth threshold 120 (C4). In some embodiments, the first threshold 120a can correspond to a quality metric or value/level that is greater than the second threshold 120 and the third threshold 120 and less than the fourth threshold 120. The console 102 can compare a first measurement 112 of the primary link 108 to the first threshold 120 at a first time period to determine whether or not to activate a secondary link 110. The second threshold 120 can correspond to a quality metric that is less than the first threshold 120, the third threshold 120 and the fourth threshold 120. The console 102 can compare a second measurement 112 of the primary link 108 to the second threshold 120 at a second time period to determine whether or not to transition traffic from the primary link 108 to the secondary link 110. The third threshold 120 can correspond to a quality metric that is greater than the second threshold 120 and less than the first threshold 120 and the fourth threshold 120. The console 102 can compare a third measurement 112 of the primary link 108 to the third threshold 120 at a third time period to determine whether or not to transition traffic from the secondary link 110 to the primary link 108. The fourth threshold 120 can correspond to a quality metric that is greater than the first threshold 120, the second threshold 120 and the third threshold 120. The console 102 can compare a fourth measurement 112 of the primary link 108 to the fourth threshold 120 at a fourth time period to determine whether or not to transition all traffic to the primary link 108 and/or to de-activate the secondary link 110. In some embodiments, the number of thresholds 120 of the inner decision loop 204 can vary. For example, the inner decision loop 204 can include less than four thresholds 120 or more than four thresholds 120.

Now referring to FIGS. 3A-3E, a method 300 for secondary links for AR/VR applications is depicted. In brief overview, the method 300 can include one or more of: establishing a primary link (302), determining a type of use (304), selecting a type of link (306), performing measurements of a link (310), comparing the measurement to a first threshold (312), maintaining traffic on the primary link (314), activating a secondary link (316), performing measurements of a link (318), comparing the measurement to a second threshold (320), maintaining traffic on the primary link (322), transitioning traffic to the secondary link (324), performing periodic measurements (326), comparing the measurement to a third threshold (328), maintaining traffic on the secondary link (330), performing measurements at determined intervals (332), identifying a candidate beam (334), waiting a determined time period (336), performing measurements of a link (338), comparing the measurement to a fourth threshold (340), maintaining traffic on the primary link (342), transitioning traffic to the primary link (344), and deactivating the secondary link (346). Any of the foregoing operations may be performed by any one or more of the components or devices described herein, for example, the console 102 and/or the head wearable display 130.

Referring to 302, and in some embodiments, a primary link 108 can be established between a console 102 and a head wearable display 130. The primary link 108 can be established by the console 102 or the head wearable display 130, for example, to provide at least one of a VR, AR, MR experience to a user of the head wearable display 130. The primary link 108 can include one or more connections, sessions or channels established between the console 102 and the head wearable display 130. The primary link 108 can include, but not limited to, a 60 GHz frequency connection (e.g., 60 GHZ WiFi, IEEE 802.11ay/ad) between the console 102 and the head wearable display 130.

Referring to 304, and in some embodiments, a type of use can be determined. The console 102 and/or the head wearable display 130 can determine a type of use for the link between the console 102 and the head wearable display 130. For example, the console 102 can determine the type of content to be transmitted, a type of traffic, a use case and/or a type of VR/AR experience to be provided to a user. The console 102 and/or head wearable display 130 can collect properties of a primary link 108 and/or secondary link 110 between the console 102 and the head wearable display 130. The console 102 and/or head wearable display 130 can collect characteristics of a user of the head wearable display 130. In some embodiments, the console 102 and/or head wearable display 130 can receive an input from a user requesting a particular type of use or a type of VR/AR experience. For example, the user can request a full VR/AR experience or application or the user can request a limited type of use (e.g., messaging, checking time, making/receiving a voice call).

Referring to 306, and in some embodiments, a link can be selected. The console 102 can select the primary link 108 or the secondary link 110 for the traffic between the console 102 and the head wearable display 130 for instance according to a type of the traffic between the console 102 and the head wearable display 130. In some embodiments, if the type of use or traffic corresponds to or includes a full VR/AR experience, the primary link 108 can be selected to carry traffic between the console 102 and the head wearable display 130. If the type of use or traffic corresponds to or includes a minimum use, partial VR/AR experience, or less than full VR/AR experience, the secondary link 110 can be selected to carry traffic between the console 102 and the head wearable display 130. In some embodiments, the console 102 can execute an inter-scheduling algorithm 126 to determine whether to use a primary link 108 or a secondary link 110 to transmit traffic (e.g., data, information) between the console 102 and the head wearable display 130. For example, the console 102 and/or head wearable display 130 can provide one or more inputs (e.g., type of use, user, type of traffic) to the inter-scheduling algorithm, and can execute the inter-scheduling algorithm to determine whether to use the primary link 108 or secondary link 110 for a particular type of use and/or type of traffic. For example, in some embodiments, 302 and 304 of method 300 can correspond to an outer/first decision loop 202 of the inter-scheduling algorithm 126 and 31-348 of method 300 can correspond to an inner/second decision loop 204 of the inter-scheduling algorithm 126.

The console 102 and/or head wearable display 130 can provide one or more inputs (e.g., type of use, user, type of traffic) to the outer decision loop 202 of the inter-scheduling algorithm 126 and can execute the inter-scheduling algorithm 126 to determine whether to use the primary link 108 or secondary link 110 for a particular type of use. The console 102 and/or head wearable display 130 can provide one or more inputs (e.g., type of use, user, type of traffic) to the inner/second decision loop 204 of the inter-scheduling algorithm 126 and execute the inter-scheduling algorithm 126 to determine whether to use the primary link 108 or secondary link 110 based in part on a link quality of the primary link 108. In some embodiments, the console 102 can execute the inter-scheduling algorithm 126 and can select the primary link 108 or the secondary link 110 to transmit traffic (e.g., data, information) between the console 102 and the head wearable display 130 responsive to executing the inter-scheduling algorithm 126.

Referring to 310, and in some embodiments, measurements of a link can be performed. The console 102 and/or the head wearable display 130 can perform measurements 112 of a primary link 108 and can determine metrics (e.g., quality metrics 124) of the primary link 108 between the console 102 and the head wearable display 130. The measurements 112 can be performed at a first time period or an initial time period to monitor the status and/or quality of the primary link 108. The console 102 can perform measurements 112 on the primary link 108 to determine if the primary link 108 is active (e.g., turned on, turned off) and/or determine a current level of traffic on the primary link 108. In some embodiments, the console 102 can perform measurements 112 on the primary link 108 to determine a link quality of the primary link 108, such as but not limited to, a signal to noise ratio of the primary link 108.

Referring to 312, and in some embodiments, the measurements (e.g., value(s) of measured quality metric(s)) can be compared to a first threshold. The console 102 can compare the measurements 112 of the primary link 108 to a first threshold 120. The first threshold 120 can include or correspond to a quality metric 124 of the primary link 108. For example, the console 102 can determine if the quality of the primary link 108 is greater than or less than a threshold 120. The first threshold 120 can be used to determine if a secondary link should be activated or if the traffic between the console 102 and the head wearable display 130 can be supported by the primary link 108.

Referring to 314, and in some embodiments, the traffic can be maintained on the primary link. The console 102 can determine that the measurements of the primary link 108 are greater or higher than the first threshold 120 and can determine that the quality of the primary link 108 is strong (e.g., stable or good) enough to support the traffic between the console 102 and the head wearable display 130. In some embodiments, the console 102 can determine, responsive to the comparison, that the signal to noise ratio is high enough or strong enough to support the traffic (e.g., current traffic, current type of use) between the console 102 and the head wearable display 130 and maintain the traffic on the primary link 108. In some embodiments, the console 102 can maintain a secondary link 110 in a deactivated or turned off state. For example, the console 102 can turn off or not maintain a secondary link when the measurements 112 of the primary link 108 are greater than the first threshold 120. The method 300 can return/proceed to (310) and the console 102 can perform subsequent or additional measurements of the primary link 108 to continue to monitor the quality or status of the primary link 108.

Referring to 316, and in some embodiments, a secondary link can be activated. The console 102 can, responsive to the first measurement 112 being less than the first threshold 120, activate a secondary link 110 between the console 102 and the head wearable display 130. The console 102 can determine that the measurements of the primary link 108 are less than the first threshold 120 and determine that the quality of the primary link 108 is decreasing such that the primary link 108 may not be strong enough to support the traffic between the console 102 and the head wearable display 130. For example, the console 102 can determine that the primary link 108 is experiencing or causing delays, service disruptions and/or failures for a user of the head wearable display 130. In some embodiments, the console 102 can determine, responsive to the comparison, that the signal to noise ratio is less than the first threshold (or a fourth threshold 120) and that the primary link 108 is experiencing difficulty or cannot support the traffic (e.g., current traffic, current type of use) between the console 102 and the head wearable display 130. The console 102 can activate a secondary link 110 between the console 102 and the head wearable display 130. In some embodiments, the console 102 can configure the secondary link 110 and can place the secondary link 110 on standby such that the secondary link 110 is activated (e.g., established) and not carrying or supporting the traffic between the console 102 and the head wearable display 130. The console 102 and/or head wearable display 130 can generate and/or provide an indication or message to the user of the head wearable display 130 that the secondary link 110 has been activated.

Referring to 318, and in some embodiments, measurements of a link can be performed. The console 102 and/or the head wearable display 130 can perform measurements 112 of the primary link 108 to continue to monitor the status or quality of the primary link 108. In some embodiments, the console 102 can perform the measurements 112 at a second time period or subsequent to first or initial measurements 112 of the primary link 108. The console 102 can perform measurements 112 on the primary link 108 to determine if the quality of the primary link 108 is greater than or less than a second threshold 120.

Referring to 320, and in some embodiments, the measurements can be compared to a second threshold. The console 102 can determine whether a second measurement 112 (e.g., value(s) of measured quality metric(s)) of the primary link 108 between the console 102 and the head wearable display 130 is less than a second threshold 120. The second threshold 120 can be less than the first threshold 120. The second threshold 120 can include or correspond to a value or level (e.g., a quality metric 124 of the primary link 108) that is less than the first threshold 120. For example, the console 102 can determine if the quality of the primary link 108 has decreased from the first measurement using the second threshold 120. In some embodiments, the second threshold 120 can be used to determine if traffic should be transitioned to the secondary link 110 from the primary link 108.

Referring to 322, and in some embodiments, the traffic can be maintained on the primary link. The console 102 can maintain the traffic on the primary link 108 when the second measurement 112 is greater than the second threshold 120. For example, the console 102 can determine that the second or subsequent measurements 112 of the primary link 108 are greater than the second threshold 120 and may determine that the quality of the primary link 108 can support the traffic between the console 102 and the head wearable display 130. The console 102 can maintain the traffic on the primary link 108 and can maintain the secondary link 110 on standby (e.g., active, no traffic). In some embodiments, the console 102 can determine, responsive to the comparison, that the signal to noise ratio is high enough or strong enough to support the traffic (e.g., current traffic, current type of use) between the console 102 and the head wearable display 130 and maintain the secondary link 110 on standby. The method 300 can return to (318) and the console 102 can perform subsequent or additional measurements of the primary link 108 to continue to monitor the quality or status of the primary link 108.

Referring to 324, and in some embodiments, traffic can be transitioned to a secondary link. The console 102 can transition, when the second measurement 112 is less than the second threshold 120, traffic on the primary link 108 to the activated secondary link 110. The console 102 can determine that the measurements of the primary link 108 are less than the second threshold 120 and can determine that the quality of the primary link 108 is not strong (e.g., stable, good) enough to support the traffic between the console 102 and the head wearable display 130. In some embodiments, the console 102 can determine, responsive to the comparison, that the signal to noise ratio is less than the second threshold 120 and that the primary link 108 is experiencing difficulty or cannot support the traffic (e.g., current traffic, current type of use) between the console 102 and the head wearable display 130. The console 102 can begin transitioning or moving traffic from the primary link 108 to the secondary link 110 between the console 102 and the head wearable display 130. The console 102 can transition some or all of the traffic between the console 102 and the head wearable display 130 to the secondary link in some embodiments. For example, the console 102 can use the secondary link 110 to transmit subsequent data and information between the console 102 and the secondary link 110 received after the comparison. The console 102 can for instance transition or move a portion (e.g., half, determined percentage) of the traffic to the secondary link 110, to transmit subsequent data and information between the console 102 and the head wearable display 130 received after the comparison. In some embodiments, the console 102 can transition all of the traffic between the console 102 and the head wearable display 130 to the secondary link 110 responsive to the second measurement 112 being less than the second threshold 120. The console 102 can provide an indication, message or command to the head wearable display 130 to inform or instruct the head wearable display 130 to use the secondary link 110 to transmit data. The console 102 and/or head wearable display 130 can generate and provide an indication or message to the user of the head wearable display 130 that traffic has been, is being or will be transitioned to the secondary link 110 from the primary link 108.

Referring now to 326, and in some embodiments, periodic measurements of the primary link can be performed. The console 102 can perform, responsive to the second measurement 112 being less than the second threshold 120, measurements 112 of the primary link 108 at first determined intervals 122 or perform periodic measurements 112. In some embodiments, the console 102 can monitor the primary link 108 by taking periodic measurements on the primary link 108 to determine when the quality of the primary link 108 increases. The measurements 112 can be performed at determined intervals or time periods. The periodic measurements 112 can be performed at evenly spaced or regularly occurring intervals such that a length of time between a first two measurements and subsequent measurements is equal. In some embodiments, the console 102 can determine a length or time between measurements 112 (e.g., time between a first measurement and a second measurement) based in part on the signal to noise ratio of the primary link 108 at a previous measurement 112. For example, the console 102 can increase a frequency (e.g., more often) or decrease the length of time between measurements 112 if the console 102 determines that the quality of the primary link 108 is increasing and/or within a determined distance from a threshold 120. In some embodiments, the console 102 can decrease a frequency (e.g., less often) or increase the length of time between measurements 112 if the console 102 determines that the quality of the primary link 108 is decreasing and/or outside a determined distance from a threshold 120.

Referring now to 328, and in some embodiments, measurements 112 can be compared to a third threshold 120. The console 102 can determine whether a third or subsequent measurement 112 of the primary link 108 is greater than or less than a third threshold 120. In some embodiments, the third threshold 120 can be less than the first threshold 120 and greater than the second threshold 120. The third threshold 120 can include or correspond to a quality metric 124 of the primary link 108 indicating that the quality of the primary link 108 is increasing (e.g., when greater than the third threshold 120) or decreasing (e.g., when less than the third threshold 120). In some embodiments, the console 102 can use the third threshold 120 to determine if traffic can be transitioned back to the primary link 108 or if the traffic should be maintained on the secondary link 110.

Referring to 330, and in some embodiments, the traffic can be maintained on the secondary link. The console 102 can determine that the third or subsequent measurements 112 of the primary link 108 are less than the third threshold 120 and may determine that the quality of the primary link 108 cannot support the traffic between the console 102 and the head wearable display 130. The console 102 can maintain the traffic on the secondary link 110, e.g., responsive to the determination. In some embodiments, the console 102 can determine, responsive to the comparison, that the signal to noise ratio of the primary link 108 is less than the third threshold 120. The console 102 can perform, responsive to a third measurement 112 after the second measurement 112 being less than the second threshold, additional measurements of the primary link 108 at second determined intervals 122. The second determined intervals 122 can be greater (e.g., longer duration between measurements) than each of the first determined intervals 122. For example, the method 300 can return/proceed to (326) and the console 102 can perform subsequent or additional measurements of the primary link 108 to continue to monitor the quality or status of the primary link 108.

Referring now to 332, and in some embodiments, measurements of the primary link can be performed at determined intervals. The console 102 can determine that a third measurement 112 of the primary link 108 is greater than a third threshold 120. The third threshold 120 can be greater than the second threshold 120 and less than the first threshold 120. For example, the console 102 can determine, responsive to the comparison, that the third or subsequent measurement 112 of the primary link 108 is greater than the third threshold and that the quality of the primary link 108 has improved or increased since the second or previous measurement 112. The console 102 can initiate taking measurements 112 of the primary link 108 at determined intervals 122. For example, in some embodiments, the console 102 and/or head wearable display 130 can wake up at the determined intervals and perform a measurement of the primary link 108.

The determined intervals 122 can be the same or modified. In some embodiments, the determined intervals 122 can be equal such that a length of time between a first two measurements 112 and subsequent measurements 122 is equal. In some embodiments, the console 102 can perform measurements at first determined intervals 122 for a first time period and at second determined intervals 122 for a second or subsequent time period. The first determined intervals 122 can be different (e.g., less time, more time) than the second determined intervals 122. The console 102 can determine a length of a determined interval 122 based in part on the signal to noise ratio of the primary link 108 at a previous measurement 112. For example, the console 102 can increase a frequency (e.g., more often) or decrease the length of time between measurements 112 if the console 102 determines that the quality of the primary link 108 is increasing and/or within a determined distance from a threshold 120. In some embodiments, the console 102 can decrease a frequency (e.g., less often) or increase the length of time between measurements 112 if the console 102 determines that the quality of the primary link 108 is decreasing and/or outside a determined distance from a threshold 120. The console 102 can use or apply exponential backoff to determine a length of time for the determined intervals 122. For example, the console 102 can multiplicatively decrease (or increase) the rate or frequency at which the measurements 112 of the primary link 108 occur such that a first determined interval 122 is different from a second, subsequent interval 122. The console 102 can determine whether a signal to noise ratio of the primary link 108 is greater than the third threshold 120 during the measurements 112 at the determined intervals 122. The console 102 can monitor the primary link 108 by taking measurements 112 at the determined intervals 122 to determine if the primary link 108 is ready to support a session between the console 102 and the head wearable display 130, or if the third measurement 112 being greater than the third threshold 120 corresponds to a false or inaccurate measurement 112.

Referring to 334, and in some embodiments, a candidate beam can be identified. The console 102 can determine that the third or subsequent measurement 112 of the primary link 108 is greater than the third threshold 120 and can identify a candidate beam 114 to establish or use for the primary link 108. The candidate beam 114 can correspond to at least one beam or signal path between the console 102 and the head wearable display 130 having a signal to noise ratio that is greater than the third threshold 120. In some embodiments, the console 102 can select at least one beam 114 having a highest signal to noise ratio out of the plurality of beams 114 that have a signal to noise ratio greater than the third threshold 120. The console 102 can attempt to establish a connection using the candidate beam 114.

Referring to 336, and in some embodiments, a connection using the candidate beam can fail (e.g., to adequately support traffic, for instance due to an unstable connection, changed conditions, dropped packets, and/or otherwise). The console 102 can determine a failure of the candidate beam 114 and can initiate a determined period to suspend search for a second candidate beam 114 for the primary link 108. For example, the console 102 can attempt to establish a connection using the candidate beam 114 and the connection may fail or the beam 114 may not be able to support the primary link 108. The console 102 can determine that the candidate beam 114 is not able to support the primary link 108, and/or that the third measurement 112 being greater than the third threshold 120 corresponds to a false or inaccurate measurement 112. The console 102 can determine or be configured to wait a determined time period for perform subsequent measurements 112 (e.g., corresponding to a forbidden time period). The length of the determined time period or wait period can vary and be selected based in part on one or more measurements 112 of the primary link 108. The console 102 can select a length of time or duration for the determined time period (e.g., wait period) and may stop performing measurements 112 of the primary link 108 during the determined time period. When the determined time period is over or complete, the console 102 can return/proceed to (332) and can perform measurements 112 at the determined intervals 122.

The console 102 can establish a connection using the candidate beam 114 for the primary link 108. In some embodiments, the console 102 can use the beam 114 or signal path to re-start and/or to reconfigure (e.g., reconfigure properties of) the primary link 108 between the console 102 and the head wearable display 130. For example, the console 102 can modify one or more properties of the primary link 108 to re-establish or reconnect the primary link 108 between the console 102 and the head wearable display 130 using the beam 114 or signal path.

The console 102 can transition the traffic on the secondary link 110 to the primary link 108 responsive to the third measurement 112 being greater than the third threshold 120. For example, the console 102 can determine that the primary link 108 can support a user session between the console 102 and the head wearable display 130 and can begin transitioning traffic from the secondary link 110 to the primary link 108. The console 102 can transition, when the third or subsequent measurement 112 is greater than the third threshold 120, traffic on the secondary link 110 to the primary link 108. The console 102 can transition some or all of the traffic between the console 102 and the head wearable display 130 to the primary link 108. For example, the console 102 can use the primary link 108 to transmit subsequent data and information between the console 102 and the head wearable display 130. The console 102 can transition or move a portion (e.g., half, determined percentage) of the traffic to the primary link 108 to transmit subsequent data and information between the console 102 and the head wearable display 130.

Referring to 338, and in some embodiments, measurements of a link can be performed. The console 102 and/or the head wearable display 130 can perform measurements 112 of the primary link 108 to continue to monitor the status or quality of the primary link 108. In some embodiments, the console 102 can perform the measurements 112 at a fourth time period or subsequent to a third or previous measurements 112 of the primary link 108. The console 102 can perform measurements 112 on the primary link 108 to determine if the quality of the primary link 108 is greater than or less than a fourth threshold 120.

Referring to 340, and in some embodiments, the measurements can be compared to a fourth threshold. The console 102 can determine whether a fourth or subsequent measurement 112 of the primary link 108 between the console 102 and the head wearable display 130 is greater than or less than a fourth threshold 120. In some embodiments, the fourth threshold 120 can be greater than the first, second and third thresholds 120. The fourth threshold 120 can include or correspond to a value or level (e.g., a quality metric 124 of the primary link 108) that is greater than the first threshold 120. In some embodiments, the fourth threshold 120 can be used to determine if secondary link 110 can be deactivated or turned off.

Referring to 342, and in some embodiments, the traffic can be maintained on the secondary link 108. The console 102 can determine that the fourth or subsequent measurement 112 of the primary link 108 is less than the fourth threshold 120. In some embodiments, the console 102 can determine that a signal to noise ratio of the primary link 108 at the fourth time period is less than the fourth threshold 120. The console 102 can (e.g., responsive to the determination) maintain the traffic between the console 102 and the head wearable display 130 on the secondary link 110. In some embodiments, the console 102 can (e.g., responsive to the determination) maintain a portion of the traffic between the console 102 and the head wearable display 130 on the primary link 108 and maintain the secondary link 110 on standby.

Referring to 344, and in some embodiments, the traffic can be transitioned to the primary link 108. The console 102 can determine that the fourth or subsequent measurement 112 of the primary link 108 is greater than the fourth threshold 120. In some embodiments, the console 102 can determine that a signal to noise ratio of the primary link 108 at the fourth time period is greater than the fourth threshold 120. The console 102 can determine if any traffic is still being supported by the secondary link 110 and may transition all traffic to the primary link 108 such that the primary link 108 fully supports one or more user sessions between the console 102 and the head wearable display 130. The console 102 can transmit an indication, message or command to the head wearable display 130 to stop using the secondary link 110.

Referring to 346, and in some embodiments, the secondary link can be deactivated. The console 102 can de-activate the secondary link 110 responsive to a fourth measurement 112 being greater than a fourth threshold 120. The fourth threshold 120 can be greater than the first threshold 120. In some embodiments, the console 102 can turn off or de-activate (e.g., disconnect, dis-establish) the secondary link 110 between the console 102 and the head wearable display 130. The console 102 can check or verify that the secondary link 110 is no longer supporting traffic between the console 102 and the head wearable display 130, and can turn off the secondary link 110. In some embodiments, the console 102 can change a status of the secondary link 110 from standby to de-activated such that the secondary link 110 is no longer available to transmit traffic between the console 102 and the head wearable display 130. The console 102 and/or head wearable display 130 can generate and provide an indication or message to the user of the head wearable display 130 that the secondary link 110 has been de-activated or turned off. The method 300 can return to (304) to continue to monitor the quality of the primary link 108 during one or more user sessions between the console 102 and the head wearable display 130.

B. Computing System

Various operations described herein can be implemented on computer systems. FIG. 4 shows a block diagram of a representative computing system 414 usable to implement the present disclosure. In some embodiments, the console 102 and head wearable display 130 of FIGS. 1A-1B are implemented by the computing system 414. Computing system 414 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 414 can be implemented to provide VR, AR, MR experience. In some embodiments, the computing system 414 can include conventional computer components such as processors 416, storage device 418, network interface 420, user input device 422, and user output device 424.

Network interface 420 can provide a connection to a wide area network (e.g., the Internet) to which WAN interface of a remote server system is also connected. Network interface 420 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 422 can include any device (or devices) via which a user can provide signals to computing system 414; computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 424 can include any device via which computing system 414 can provide information to a user. For example, user output device 424 can include a display to display images generated by or delivered to computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 416 can provide various functionality for computing system 414, including any of the functionality described herein as being performed by a server or client, or other functionality associated with message management services.

It will be appreciated that computing system 414 is illustrative and that variations and modifications are possible. Computer systems used in connection with the present disclosure can have other capabilities not specifically described here. Further, while computing system 414 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
determining, by a console, that a first measurement of a primary wireless link between the console and a head wearable display is less than a first threshold, the first measurement corresponding to a quality metric of the primary wireless link at a first time;
activating, by the console responsive to the first measurement being less than the first threshold, a secondary wireless link to be on standby, the secondary wireless link between the console and the head wearable display, the primary wireless link supporting a higher throughput than the secondary wireless link;
determining, by the console, whether a second measurement of the primary wireless link between the console and the head wearable display is less than a second threshold, the second measurement corresponding to the quality metric of the primary wireless link at a second time, wherein the second threshold is less than the first threshold; and
transitioning, by the console when the second measurement is less than the second threshold, traffic on the primary wireless link to the activated secondary wireless link.

2. The method of claim 1, wherein the quality metric comprises a signal to noise ratio of the primary wireless link.

3. The method of claim 1, further comprising:
maintaining, by the console, the traffic on the primary wireless link when the second measurement is greater than the second threshold.

4. The method of claim 1, further comprising:
performing, by the console responsive to the second measurement being less than the second threshold, measurements of the primary wireless link at first determined intervals.

5. The method of claim 4, further comprising:
performing, by the console responsive to a third measurement corresponding to the quality metric of the primary wireless link at a third time after the second time being less than the second threshold, additional measurements of the primary wireless link at second determined intervals, wherein each of the second determined intervals is greater than each of the first determined intervals.

6. The method of claim 1, further comprising:
determining, by the console, that a third measurement corresponding to the quality metric of the primary wireless link at a third time is greater than a third threshold, wherein the third threshold is greater than the second threshold and less than the first threshold; and
identifying, by the console, a first candidate beam for the primary wireless link, responsive to the third measurement being greater than the third threshold.

7. The method of claim 6, further comprising:
determining, by the console, a failure of the first candidate beam; and initiating, by the console, a determined period to suspend search for a second candidate beam for the primary wireless link.

8. The method of claim 6, further comprising:
transitioning, by the console, the traffic on the secondary wireless link to the primary wireless link using the first candidate beam, responsive to the third measurement being greater than the third threshold.

9. The method of claim 8, further comprising:
de-activating, by the console, the secondary wireless link responsive to a fourth measurement corresponding to the quality metric of the primary wireless link at a fourth time being greater than a fourth threshold, wherein the fourth threshold is greater than the first threshold.

10. The method of claim 1, further comprising:
selecting, by the console, the primary wireless link or the secondary wireless link for the traffic between the console and the head wearable display according to a type of the traffic between the console and the head wearable display.

11. A console comprising:
one or more processors configured to:
determine that a first measurement of a primary wireless link between the console and a head wearable display is less than a first threshold, the first measurement corresponding to a quality metric of the primary wireless link at a first time;
activate, responsive to the first measurement being less than the first threshold, a secondary wireless link to be on standby, the secondary wireless link between the console and the head wearable display, the primary wireless link supporting a higher throughput than the secondary wireless link;
determine whether a second measurement of the primary wireless link between the console and the head wearable display is less than a second threshold, the second measurement corresponding to the quality metric of the primary wireless link at a second time, wherein the second threshold is less than the first threshold; and
transition, when the second measurement is less than the second threshold, traffic on the primary wireless link to the activated secondary wireless link.

12. The console of claim 11, wherein the quality metric comprises a signal to noise ratio of the primary wireless link.

13. The console of claim 11, wherein the one or more processors are further configured to:
maintain the traffic on the primary wireless link when the second measurement is greater than the second threshold.

14. The console of claim 11, wherein the one or more processors are further configured to:
perform, responsive to the second measurement being less than the second threshold, measurements of the primary wireless link at first determined intervals.

15. The console of claim 14, wherein the one or more processors are further configured to:
perform, responsive to a third measurement corresponding to the quality metric of the primary wireless link at a third time after the second time being less than the second threshold, additional measurements of the primary wireless link at second determined intervals, wherein each of the second determined intervals is greater than each of the first determined intervals.

16. The console of claim 11, wherein the one or more processors are further configured to:

determine that a third measurement corresponding to the quality metric of the primary wireless link at a third time is greater than a third threshold, wherein the third threshold is greater than the second threshold and less than the first threshold; and identify a first candidate beam for the primary wireless link, responsive to the third measurement being greater than the third threshold.

17. The console of claim 16, wherein the one or more processors are further configured to:

determine a failure of the first candidate beam; and initiate a determined period to suspend search for a second candidate beam for the primary wireless link.

18. The console of claim 16, wherein the one or more processors are further configured to:

transition the traffic on the secondary wireless link to the primary wireless link using the first candidate beam, responsive to the third measurement being greater than the third threshold.

19. A non-transitory computer readable medium storing instructions when executed by one or more processors cause the one or more processors to:

determine that a first measurement of a primary wireless link between a console and a head wearable display is less than a first threshold, the first measurement corresponding to a quality metric of the primary wireless link at a first time;

activate, responsive to the first measurement being less than the first threshold, a secondary wireless link to be on standby, the secondary wireless link between the console and the head wearable display, the primary wireless link supporting a higher throughput than the secondary wireless link;

determine whether a second measurement of the primary wireless link between the console and the head wearable display is less than a second threshold, the second measurement corresponding to the quality metric of the primary wireless link at a second time, wherein the second threshold is less than the first threshold; and transition, when the second measurement is less than the second threshold, traffic on the primary wireless link to the activated secondary wireless link.

20. The non-transitory computer readable medium of claim 19, further comprising instructions when executed by the one or more processors further cause the one or more processors to:

select the primary wireless link or the secondary wireless link for the traffic between the console and the head wearable display according to a type of the traffic between the console and the head wearable display.

* * * * *